March 1, 1955  S. R. RICH  2,703,396
UNDERWATER ECHO RANGE AND BEARING APPARATUS
Filed Nov. 11, 1944  5 Sheets-Sheet 1

Inventor
STANLEY R. RICH

By  T. E. Bush
Attorney

United States Patent Office 2,703,396
Patented Mar. 1, 1955

2,703,396

UNDERWATER ECHO RANGE AND BEARING APPARATUS

Stanley R. Rich, Cambridge, Mass., assignor to the United States of America as represented by the Secretary of the Navy Application November 11, 1944, Serial No. 563,042

12 Claims. (Cl. 340—6)

This invention relates to apparatus for determining the direction and range of a source of compressional wave energy.

The invention is of special utility in underwater sound echo ranging and is described in this connection in the following specification. However, it should be understood that it is equally applicable in conjunction with other forms of wave energy direction and range finding or indicating systems.

The general object of the invention is to provide a device which will quickly and accurately determine the bearing and range of a source of radiated wave energy with respect to a point of observation.

A brief discussion of the prior art will be conducive to a complete understanding of this invention and the many advantages and new results made possible by it.

In the prior art underwater compressional wave or sound echo ranging systems, intermittent pulses or pings of compressional wave energy are projected from a transducer, usually of the type having magnetostrictive or piezoelectric elements, carried underwater by a searching vessel.

The design characteristics of the transducer are such that the energy is projected therefrom in a relatively narrow, conical beam, the axis of the beam usually being substantially horizontal. The energy is usually at supersonic frequency although it may be otherwise and is commonly referred to in the art as "sound" even though it be above the normally audible range.

The transducer is mounted for rotation and the operator thus searches around the entire underwater horizon in steps for targets. At each step, the operator sends out a pulse and then waits for a certain length of time to see whether or not any echo is heard. If no echo is heard, the transducer is turned slightly and the process repeated.

When an energy pulse strikes an underwater target such as a submarine, it is reflected or echoed back to the transducer, the latter now being connected to act as an energy receiver. The energy pulse impinging upon the elements of the transducer generates electromotive forces therein and these latter are used to give audible and/or visual indications to the operator. The operator by noting the bearing toward which the transducer is trained when an echo is received will know that a target lies somewhere along such bearing.

The speed of supersonic wave energy in water is substantially constant at about 1600 yards per second. Thus the range of a target may be computed from the time required by the energy pulse to travel from the transducer to the target and back again.

The energy pulses, or pings, may be timed for any particular range such as for example 2000 yards; that is, so as to permit the echo of a ping to return from a target within a 2000 yard range before the next ping is sent out. Thus, if the operator searches around the entire underwater horizon at a 2000 yard range, 6° at a trial, sixty pings are required. If three seconds are allowed for training, pinging and listening, such a search requires three minutes. At a 5000 yard range, six or seven minutes are required.

A conspicuous shortcoming of the "searchlight" search procedure described above is that only a very small part of the region within acoustical range of the searching vessel is covered at any one time. The need for continual change of transducer bearing calls for considerable skill and effort on the part of the operator. If any sound is heard which might be an echo, time is required to ping several times in that particular direction and this results in incomplete coverage of other portions of the area which should be within reach. After contact is obtained, the skill of the operator is put to further test in maintaining contact, and, if cut-on procedure is used, both range and bearing data are obtained at intervals which are disproportionately long compared to the brief time available for attack.

In contrast to the time consuming search procedure described above, and as an improvement thereon, there is disclosed in the co-pending application of O. Hugo Schuck, Serial No. 536,172, filed May 18, 1944, now Patent #2,473,974, a scanning echo ranging system in which pulses of acoustic energy of predetermined duration are emitted intermittently from a transducer, the output characteristics of which are such that the acoustic wave is emitted with substantially equal intensity in all directions in a horizontal plane. Echoes of the wave from a target are received by a directionally sensitive transducer which is caused to rotate mechanically.

The period required for one revolution of the receiving transducer, however, determines the duration period of the pulse, the latter being at least equal to the former, so that the receiving transducer will be able to scan the entire underwater horizon during the period that the returning pulse echo is passing through the position of this transducer. Thus if the receiving transducer rotates at 4 R. P. S. the duration period of the transmitted pulse must be at least ¼ sec.

Accordingly, at some time in the duration period of the returning echo, the directivity pattern of the receiving transducer will be pointed in the direction from which the echo is coming. A cathode ray oscilloscope tube with a spiral beam sweep synchronized with the rotating receiver is utilized in the system and connections to the tube elements are such that the spirally sweeping beam spot will brighten when an echo is received. Thus the bearing of the beam spot, when it brightens, relative to the center of the tube screen is always the same as the bearing of the receiver directivity pattern at which the echo pulse is received. The distance of the brightened spot from the center may be calibrated in terms of target range since a spiral sweep begins with each energy pulse transmitted and increases in size uniformly with time after emission of the pulse. The beam spot therefore brightens at a point corresponding to the range and bearing of each underwater object from which an echo is reflected. A long persistence screen is used to allow an easy observation of all the bright spots and so the operator is furnished a continuous pictorial pattern of all targets in the underwater field.

While the scanning system embodied in the mechanically rotated receiver represented a considerable advance in the art since it scanned the entire underwater horizon in somewhat less than a second as compared to minutes required under the old systems, it does have certain disadvantages. A mechanically rotated receiver requires considerable rigging and creates noise because of its rotation. Further from an operating viewpoint, the relatively long pulse length required, because of the limitation in rotation rate of the receiving transducer, produces a considerable amount of reverberation which may make it somewhat difficult to clearly distinguish pulse echoes coming from targets at relatively short ranges.

As an improvement over the arrangement shown in the aforesaid application, Serial No. 536,172, in which scanning of the underwater horizon is done by a mechanically rotated direction sensitive transducer, there is shown in application Serial No. 549,460 filed August 14, 1944, by O. H. Schuck et al., an arrangement in which the scanning transducer (a thirty-six segment cylindrical unit) is fixed in position but is rendered directionally sensitive through the use of a commutator of the capacitor or magnetic type which connects the receiver of the system with only a group of adjacently disposed segments of the transducer at any one instant, the remainder being rendered non-responsive. A phase shifting network is used to bring the signals received respectively by all the instant connected transducer segments into a common phase relationship in order to produce a well patterned total signal. The direction of maximum receiving sensitivity is along an axis through the center segment of the instant connected group and this direction is steered around the underwater horizon as the commutator and phase shifting network rotate.

While the arrangement in application Serial No. 549,460 marks a considerable advance in the art and operates well, the apparatus from a design point of view has its limitation since it requires a phase shifting network to be housed within a commutator rotor and coupling at the rotor ends, and is limited in its scanning speed by the speed at which a rotor can be driven.

The principal object of this invention is, therefore, to provide a still further improved arrangement for scanning the underwater horizon which permits use of a stationary phase shifting network with a permanently connected and stationary electronic rotator for connecting successive groups of the transducer segments into the receiver circuit via the network, and capable of operating at much higher scanning speeds.

This and other objects of the invention will become more apparent from the detailed description which now follows and from the drawings.

In the drawings, in which like parts are identified by like reference numerals.

Figure 1:
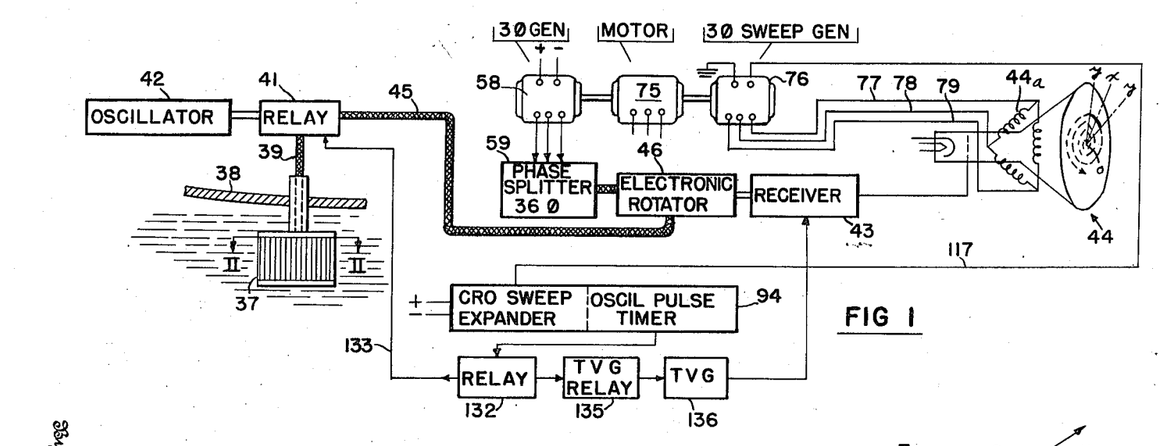
Fig. 1 is a diagrammatic illustration of a preferred embodiment of the invention.
Figure 2:
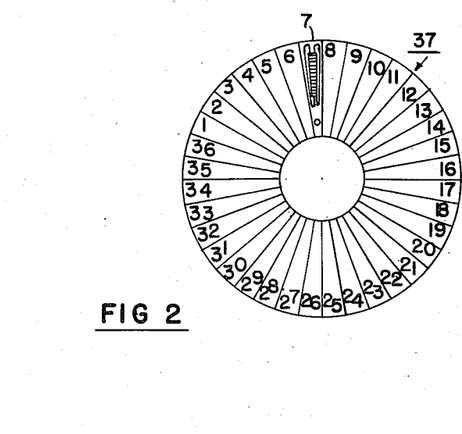
Fig. 2 is an enlarged plan view of the thirty-six segment transducer used in the system and taken on lines II—II of Fig. 1.

Referring now to the drawings, a transducer 37 for sending out pulses of compressional wave energy preferably of supersonic frequency, is shown projecting down into the water through a ship's hull 38. This transducer, which is also used for receiving pulse echoes, contains a plurality of like elements or segments, in the present instance thirty-six in number, and identified accordingly by reference numerals 1–36 in Fig. 2. For purposes of simplification in drawing, only one of them, element 7, is shown in detail in Fig. 2 and in an enlarged perspective in Fig. 3. It is understood, however, that all other segments are of the same construction.

Figure 3:
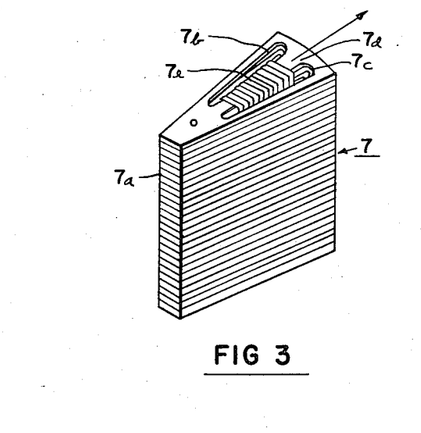
Fig. 3 is a still further enlarged perspective of one of the transducer segments.

As shown clearly in Fig. 3, the transducer segment 7 may consist of an elongated stack of laminations 7a of magneto-sensitive material such as nickel secured together by suitable cement and clamping means, not shown. The laminations, having a thickness of the order of .005" to .010" in the form shown, contain a pair of like cutouts 7b and 7c so that when stacked, a central core 7d is formed, around which the energizing coil 7e is wound.

As is well known, when coil 7e is supplied with high frequency current, the alternating changes in the magnetic field thereby produced causes the transducer segment 7 (when polarized) to expand and contract at this same frequency along the direction of the arrow in Fig. 3 to send out compressional wave energy into the surrounding medium. Conversely, when segment 7 is made to expand and contract by incoming wave energy, electromotive forces are generated in the coil 7e.

The two ends of each coil 7e of the thirty-six segments are led out of the transducer 37 in a thirty-six pair conductor cable 39 into a relay 41. Relay 41, the control of which will be explained hereinafter in more detail, connects the transducer segments alternately to an oscillator 42 for transmitting an energy pulse and then to a receiver 43 and cathode ray oscilloscope 44 for visually indicating reception of a pulse echo from a target.

Relay 41 and oscillator 42 are of conventional construction and hence have been shown only in block form.

Figures 4, 5, 6:
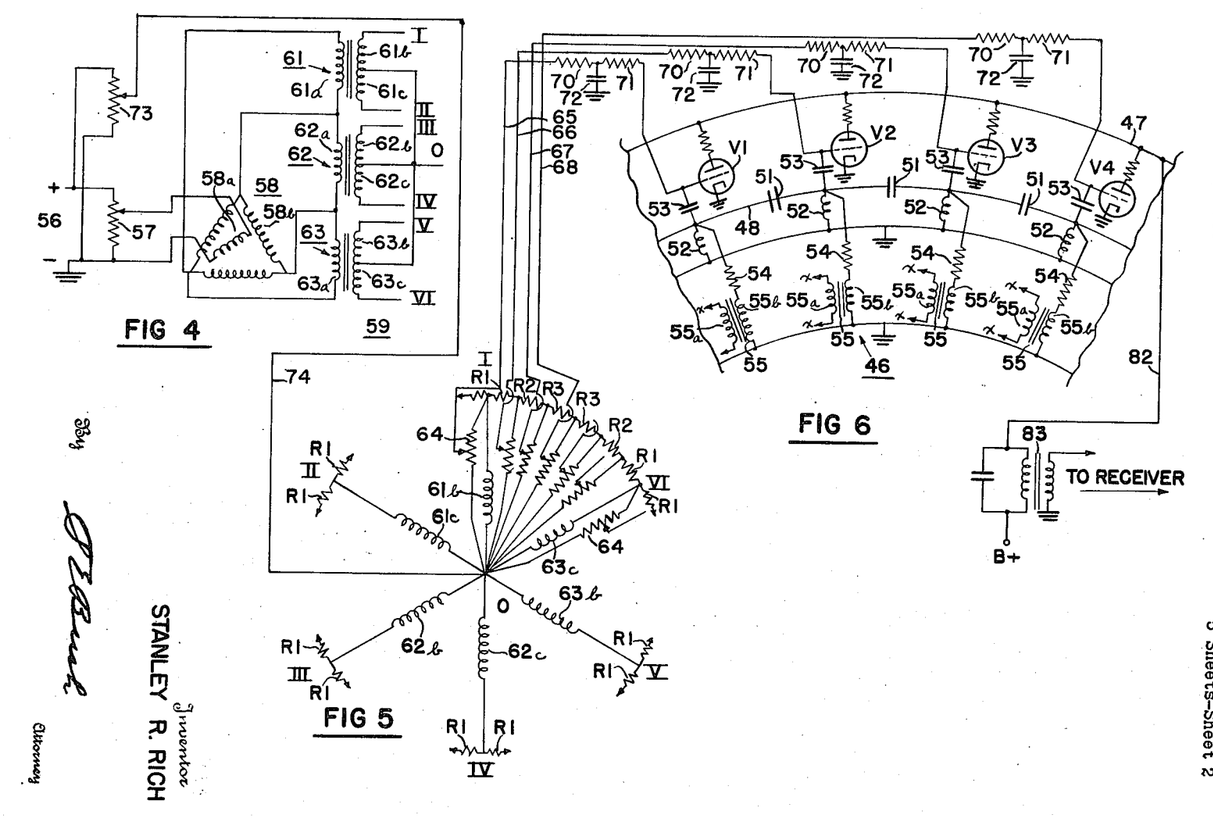
Fig. 4 is a circuit diagram of a six phase A. C. supply.
Fig. 5 is a diagram of the circuit connections for the secondaries of the transformers shown in Fig. 4 which produce thirty-six phases of voltage.
Fig. 6 is a circuit diagram of a portion of the thirty-six element electronic rotator and the phase shifting network associated therewith.

Referring now to Figs. 1 and 6, each of the aforesaid thirty-six conductor pairs grouped in a cable 45 are led from relay 41 and feed into an electronic rotator 46, a portion only of one form of which is shown in Fig. 6.

This electronic rotator 46 in the form shown in Fig. 6 includes thirty-six electronic valves, triodes in this instance, connected together in a ring. However, in the interest of simplifying the disclosure, only four of them, triodes V1, V2, VV3 and V4, are shown. All of the plates of these triodes are connected together by a conductor 47 to form a closed ring. The cathodes of all of the triodes are grounded, so that the grid circuits are the essential ones to be considered. As will be hereinafter explained, the triodes V1, V2 and V3 etc. serve three functions which should be borne in mind.

First, they supply the proper amount of reactance to their several circuits so that the signals from a plurality of segments of transducer 37 can be made to add together to give a strong, well patterned signal to the receiver; secondly, these triodes serve as preamplifiers for the receiver; and thirdly, they act as an electronic switch means to accomplish pattern rotation.

A lead line 48 is provided and includes thirty-six sections of capacitance 51 and inductance 52, each section being connected to a respective triode grid through capacitances 53. The components of the lead line are chosen to provide what has been experimentally determined as optimum characteristics, namely 55° lead per section with 3½ db. attenuation of the signal per section. At the take-off point of the lead line, the grid circuit of each of the triodes is connected through a resistance 54 to a secondary 55b of a matching transformer 55, the primary 55a of which is connected by leads marked x—x to a correspondingly positioned section of the thirty-six segment transducer 37 via the conducting cable 45.

Biasing voltage for the grid circuits of the triodes V1, V2, V3, etc. may be supplied from a thirty-six phase power supply which is shown schematically in Fig. 1 and in detail in Figs. 4 and 5.

Referring now to Figs. 1, 4 and 5, a source of direct current 56 and potentiometer 57 are provided to energize the field 58a of a three phase A. C. generator 58. The stator 58b of generator 58 is delta connected and supplies three phase current to the primaries 61a, 62a and 63a respectively of transformers 61, 62 and 63 which comprise a part of phase splitter 59. The secondary of each of these transformers is center tapped to form a common terminal O. A total of six star connected secondary windings 61b—61c, 62b—62c and 63b—63c are thus provided.

As shown in Fig. 5, where the leads from the six secondaries are labeled I—VI, respectively, each arm of the star connected secondaries is connected to an adjacent arm through a set of six resistors. However, in the interest of simplicity, only the resistor set between secondary arms I and VI has been shown, it being understood that like resistor sets are connected between the other remaining secondary arms.

The resistor set between arms I and VI comprises resistors R1, R2, R3, R3, R2 and R1 in that order, and connections to the common point O are made between adjacent resistors so that from the complete ring so formed, thirty-six phases of voltage can be taken off. Instead of connecting directly to the midpoints between resistors, it has been found advantageous to take the voltages from potentiometers 64 connected in the circuits to the common point O. The values of the resistors are chosen to give as accurately as possible the proper phase shifts. The following ratio of resistances has been found satisfactory:

R1—9,225 ohms
R2—8,145 ohms
R3—7,630 ohms

The thirty-six voltages produced in the phase splitter 59, each of which is 10° out of phase with the next adjacent voltage, are fed into the grids of correspondingly disposed triodes in the electronic rotator 46 shown in Fig. 6. Conductors 65, 66, 67 and 68 feed the grids of triodes V1, V2, V3, and V4, respectively. Resistors 70 and 71, series connected, with a capacitor 72 connected therebetween to ground are preferably inserted in each of the conductors 65—68.

A direct current negative bias for the grids of triodes V1, V2, etc., is utilized and this may be supplied in any convenient manner. In the present embodiment, this D. C. component of grid bias is obtained from a potentiometer 73 which is connected into the direct current source 56. From potentiometer 73, the direct current feeds over conductor 74 to the common point O in phase splitter 59 and thence to the respective triode grids over conductors 65, 66, 67, 68, etc.

From what has been said, it is now apparent that the grid in each of the triodes V1, V2, V3, etc., receives a D. C. bias component from source 56 and an A. C. bias component from the phase splitter 59. It is also apparent that the A. C. voltage component on the grid of one triode such as V1 is 10° apart in phase from the A. C. voltage component on the grid of the next adjacent triode such as V2.

Normally, the grids of all of the thirty-six triodes V1, V2, V3, etc., in the electronic rotator 46 are biased to cut-off by the negative D. C. voltage component taken from potentiometer 73. If it be assumed, for example, that this D. C. component is —50 volts, it is apparent that if the triode cut-off point is —2 volts, a positive potential from the A. C. phase splitter 59 amounting to +49 volts (peak value) superposed on the D. C. component will be sufficient to drive the potential of the grid to —1 volt which is above cut-off and the triode will hence pass current between cathode and anode. The triode will continue to conduct and permit a signal to be impressed on its anode only so long as its grid bias is maintained above cut-off. The duration of this period can be adjusted by the potentiometers 73 and 64 which control respectively, the D. C. and A. C. bias components on the triodes.

Since the grids of the triodes V1, V2, V3, etc., are all connected in a consecutive manner to correspondingly disposed components of A. C. in the phase splitter 59, it will now be seen that they become conductive successively around the triode ring as determined by the speed of the three phase generator 58. Generator 58 may be driven, for example, at 60 R. P. S. from a motor 75.

It has been found best to maintain the conductive period of each triode long enough so that a number of them, for example a group of five, are simultaneously conductive and to add their signals together by means of the lead line 48. Due to the sinusoidal variation in the A. C. grid bias potential, the triodes V1, V2, V3, etc., will be in various stages of conductivity at any particular instant. Thus if five of them are active, the center one of the group will be most conductive and the two on each side of it will be progressively less conductive. However, all of them will contribute to a signal delivered to the receiver 43.

Normally each section of the lead line 48 has a phase lead of 55°. It has been found that it is necessary to equal the phase output characteristics of the transducer itself only as far as 4 sections each side of the center of the signal direction in order to produce a satisfactory pattern. The conducting tubes amplify the signals appearing at individual sections of the lead line and combine these amplified signals directly in their common anode circuits. If, now, triode V1 amplifies a signal appearing at its grid by an amount 2G, and triode V2 amplifies the signal (55° ahead in phase and —3½ db in amplitude) as it appears at the V2 grid by an amount G, the resultant is a vector at an angle approximately 25° ahead of the original signal as it appears to V1. With an arrangement such that a group of five triodes is simultaneously conductive, it has been found that in connection with the center triode in the group, the phase shift is reduced to about 25°; for the pair of triodes on either side of the center one, the shift in phase is reduced to about 40°; and for the next succeeding triode pair, the shift remains at about 55°. Thus individual signals which may be received successively by the group of transducer segments associated with their active triodes are caused to add and thereby produce a single, strong signal for the receiver 43, which signal is further supplemented by signals received by the transducer segments associated with triodes which are not conducting at that instant but which, nevertheless, add their effect through the lead line 48 to the resultant signal put out to the receiver 43.

Also rotated by motor 75 is a three phase sweep generator 76 whose output is connected via conductors 77, 78 and 79 to three symmetrically placed windings 44a on oscilloscope 44 to effect rotation of its beam on the oscilloscope screen. By periodically varying the amplitude of the voltage output from generator 76 linearly with time and synchronizing these periodic variations with pulse transmission, the beam spot is made to periodically expand outwardly from the screen center in a spiral. This feature will be discussed in further detail in a later part of the specification.

From what has been said, it will now be evident that with only a small group of triodes of the electronic rotator 46 conductive at any one time, an echo signal incoming to the transducer along an axis perpendicular to the transducer segment associated with the center element of the triode group then conductive will produce a maximum response in the receiver 43 and hence a maximum indication on the screen of oscilloscope 44. Thus the transducer 37, for receiving, is rendered directionally sensitive and the polar diagram of the receiving pattern constitutes a major lobe with its axis perpendicular to a particular transducer segment. Now, as the voltages in the thirty-six elements of phase splitter 59 rise and fall in succession and thereby render the triodes in the electronic rotator 46 successively conductive in groups, it will be seen that the receiving pattern of the transducer is steered around the underwater horizon rapidly and smoothly in synchronism with rotation of the A. C. generator 58.

In setting up the apparatus, the segments of transducer 37 and their connections with the grid circuits of the triodes V1, V2, V3, and V4, etc., should be so oriented with respect to generator 58, the phase splitter 59 associated therewith and generator 76 that the bearing of a pulse echo relative to the stationary transducer 37 will be indicated at a like bearing on the screen of the oscilloscope. The screen center represents the position of transducer 37 on the attacking vessel and the top of the screen may be made to represent the bow of the vessel so that all bearing indications on the screen will be relative to the lubber line of the vessel.

Figure 7:
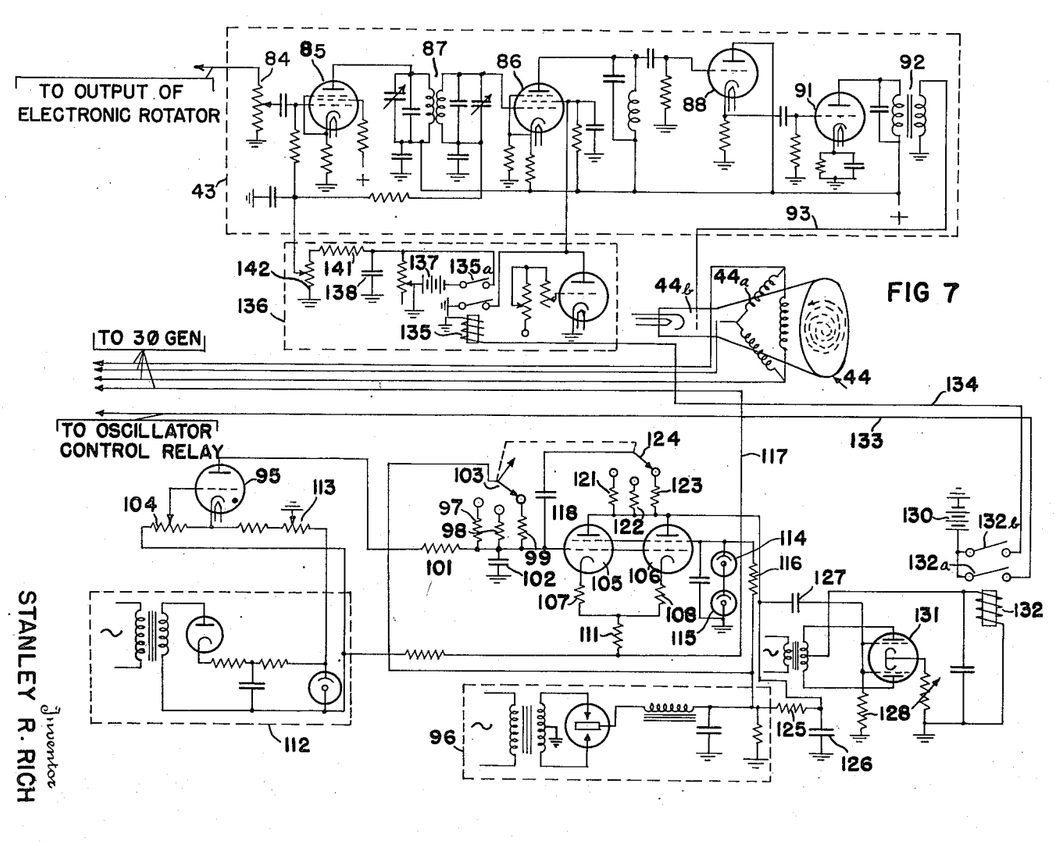
Fig. 7 is a schematic diagram of certain components of the system.

From conductor 47 connecting all the anodes of the triodes V1, V2, V3 and V4, etc., in a ring, the echo signal is taken via conductor 82 and transformer coupling 83 into the receiver 43, already mentioned, and indicated by this reference numeral in Fig. 7.

Referring now to Fig. 7, the receiver 43 comprises an input attenuator 84 followed by two stages of amplification in tubes 85, 86 which may be of the 6SG7 type with a band pass filter 87 therebetween. The output of the tube 86 feeds the input grid of tube 88 which may be a 6J5. The cathode of tube 88 is coupled to the input grid of a second 6J5 (tube 91) and the output of the latter tube feeds the primary of an output transformer 92. Conductor 93 connects the secondary of this transformer to the brightening grid 44b of oscilloscope 44.

Intermittent operation of oscillator 42, whereby transducer 37 is caused to send out energy pulses of a duration period at least equal to the period required for the electronic rotator to make one complete revolution, in the present case ⅟₆₀ sec., is obtained from the component parts generally identified by reference numeral 94 in Fig. 1 and shown in detail in Fig. 7. Preferably the pulse length is made slightly longer than ⅟₆₀ sec., such as ⅟₅₀ sec. so that it will always be certain that the rotating directivity pattern of the transducer 37 will be pointing in the direction of the incoming echo pulse signal while the latter is passing through the situs of the transducer.

With particular reference to Fig. 7, a gas discharge tube 95 which may be a 2051 "Thyratron," is used to determine the interval between the transmitted pulses. Its anode circuit is fed from power supply 96 through resistors 97, 98 or 99, and resistor 101. Capacitor 102, in conjunction with the selected one of the resistors 97, 98, 99 as selected by switch 103 determines the interval. Fine adjustment of this interval is made by means of a variable resistor 104 in the grid circuit. A sawtooth wave is thus generated by the gas discharge tube 95 in a manner well known to the art and this voltage wave is applied to the grids of power tubes 105, 106, which may be type 6L6. These latter tubes have their anodes, screens, and grids tied together; their cathodes are isolated to prevent parasitic oscillation by resistors 107, 108 but otherwise have a common resistor 111 and return to ground through a negative power supply 112 and adjustable resistor 113.

The screens are paralleled and are maintained at a constant potential with respect to ground by the action of the voltage regulator tubes 114 and 115, the positive current supply being furnished through resistor 116 and power supply 96.

The cathode current of tubes 105 and 106 also returns to ground through lead 117 and the field of the three phase sweep generator 76 shown in Fig. 1. In order for the spiral sweep trace on tube 44 always to start at the center of the tube, it is necessary that the current through the field of sweep generator 76 be zero at the beginning of the sweep. This is made possible by adjustment of the resistor 113.

Since it is desirable that the sweep be perfectly linear and since the vacuum tubes 105 and 106 have curved characteristics, a feedback circuit is used to achieve the necessary linearity. This feedback circuit operates in a well known manner and consists of capacitor 118 and resistors 121, 122 or 123 as determined by the setting of switch 124 which is mechanically ganged with the pulse interval selection switch 103.

The anode supply for tubes 105 and 106 is obtained from power supply 96 through resistor 125 and filter capacitor 126. The rapid flyback in the sawtooth plate current wave form is differentiated through the action of capacitor 127 and resistor 128 and applied to the paralleled grids of the double triode 131. This latter tube acts as a full wave rectifier during the time when the grids are in the region above cut-off when the pulse is applied to their grids. Therefore, plate current is drawn through relay 132 and the circuits through relay contacts 132a and 132b are closed. The circuit through contacts 132a and lead 133 controls energization of oscillator control relay 41 shown in Fig. 1 from battery source 130. The circuit through contacts 132b and lead 134 controls energization of a relay 135 in a TVG circuit 136 from the battery source 130.

As seen from Fig. 1 and previously explained, energization of relay 41 connects the oscillator 42 to transducer 37.

Relay 135 which is energized simultaneously with relay 41, functions to impress a time varied gain (TVG) from the circuit generally identified by reference numeral 136 on amplifier tube 85 of receiver 43 so that the intense reverberation immediately following the termination of a transmitted pulse will be suppressed. This is desirable to protect the oscilloscope 44 as the signal level of the reverberation is usually quite high, and further to permit a more distinct indication of the pulse echo from a target, on the oscilloscope screen.

In particular, closure of relay contacts 135a completes a charging circuit from battery 137 to capacitor 138 and the negative potential on this capacitor is impressed across the control grid of amplifier tube 85. This potential is sufficient to substantially block tube 85. However, when relay contacts 135a open upon de-energization of relay 135, which occurs at the end of an energy pulse from transducer 37, capacitor 138 will discharge gradually through fixed resistor 141 and variable resistor 142 thereby gradually reducing its potential and hence restoring the gain of tube 85. Thus nearby reverberation is practically blocked out but by the time a pulse echo from a true target comes in, the gain of tube 85 has been restored to its normal high value.

It should be appreciated that any gain control system which will satisfactorily temporarily reduce the amplifier output after the ping may be used instead of the TVG circuit described.

As previously discussed in an earlier part of this specification, a new spiral sweep for the electron beam in oscilloscope 44 is initiated with each pulse transmission or "ping" so that the range of the target from the source of pulses may be determined. This is accomplished by periodically increasing the field current in the sweep generator 76 uniformly with time from a substantially zero value at pulse transmission. Increase of generator field current increases the three phase output potential impressed across the oscilloscope beam deflecting coils 44a and hence causes the beam to sweep the screen in an expanding spiral.

The increasing potential for the field of generator 76 is fed over conductor 117, and its duration period, at the end of which flyback of the beam occurs, is controlled by the commonly operated range selector switches 103 and 124. These switches also control the pulse repetition rate since it is evident that the energy pulses emitted from transducer 37 must be so spaced that a pulse will not be repeated while the oscilloscope beam is still sweeping the range selected for the immediately preceding pulse. In other words, flyback of the beam sweep associated with one pulse must occur before the next pulse is sent out.

Thus with a known speed of compressional wave energy through the water of approximately 1600 yards per sec. and allowing one-half of the time interval between successive periods of pulse transmission by transducer 37 as the maximum time over which any echo may be received from the selected range before the next pulse is sent out, it will be seen, for example, that a range of 4000 yards will be obtained by spacing successive energy pulses at five second intervals. Thus in the present apparatus, with a pulse interval of five seconds, the electron beam of oscilloscope 44 will expand spirally with each transmission of a pulse for a period of approximately five seconds at which time fly-back will occur and the expanding spiral will be repeated with the transmission of the next energy pulse.

*Operation*

The specific apparatus so far described functions in the following manner: Depending upon the particular setting of the range switches 103 and 124, relay 132 is energized at intervals for periods of about 1/60 sec. each, it being assumed that motor 75 is run at 60 R. P. S. Each time that relay 132 is energized, relay 41 is energized for the same period which causes compressional wave energy to be emitted from transducer 37 for a period of 1/60 of a sec. The connections in relay 41 are such that when the relay is energized, all thirty-six segments in transducer 37 are connected in parallel with the output of the oscillator 42 with the result that the pattern, in plan, of an emitted pulse is an annulus having a width equal to the distance that the pulse travels through the water in 1/60 of a sec. and of steadily increasing diameter.

Relay 135 is also energized simultaneously with relay 132 and operation of the former places a negative blocking potential upon the input grid of amplifier 85 which thereby serves to block out the immediately following reverberation from the screen of the oscilloscope 44. When relay 132 opens, relays 41 and 135 are also opened. Contacts on relay 41 then connect the transducer segments to the grids of the thirty-six correspondingly disposed triodes V1, V2, V3, etc., in the electronic rotator 46 via the primaries of the thirty-six transformers 55, one of each of the latter being provided for each triode grid circuit as previously described. The apparatus is thereby conditioned for intercepting any echo which may be reflected from one or more targets around the underwater horizon.

As the generator 58 rotates, it provides successive generation of the thirty-six voltage components, each 10° apart in phase, which are created by phase splitter 59. Triodes V1, V2, V3, etc., are thus caused to become conductive in succession. That is to say, for every complete revolution of the field element 58a of generator 58 relative to its three phase stator element 58b, each of the thirty-six triodes, V1, V2, V3, etc., become conductive for a brief period. Also as previously explained, selection of the D. C. and A. C. grid bias components of these triodes is preferably such that a group of them, such as five, are rendered simultaneously conductive at any one instant. Thus as the generator 58 and hence also the thirty-six voltages in the phase splitter 59 rotate, one after another of the transducer segments is, in effect, connected into the grid circuit of the center triode of the instant group of five which are then conductive with the result that the sensitivity lobe of the transducer rotates synchronously with generator 58. As above stated the sensitivity lobe comprises not only the instant group of five directly activated segments, but, in addition, contributions from adjacent segments entering through the lead line.

As previously explained, since the pulse period is 1/60 of a sec., any echo of the transmitted pulse will be passing the transducer for the same period. As the sensitivity lobe of the transducer completes one revolution each 1/60 of a sec. it is apparent that at some time during the duration period of any returning echo of the pulse transmitted, the sensitivity lobes of the transducer 37 will be pointed in the direction from which the echo is coming.

Any such echo received by the transducer thus produces in the common plate circuit 47 of the thirty-six triodes V1, V2, V3, etc., a corresponding signal which is taken off through conductor 82, fed through transformer 83 and receiver 43 and thence on to the brightening grid 44b of oscilloscope 44.

In the meantime, amplifier 85 has been gradually unblocked by the discharge of capacitor 138 which takes place upon the opening of relay 135, so that by the time the pulse echo has been fed into receiver 43, the gain of amplifier tube 85 has been restorted to a suitable value thereby allowing the pulse echo to be properly amplified for satisfactory indication on the screen of the oscilloscope 44.

Also at the time relay 132 opens, a potential increasing linearly with time is fed over conductor 117 to the field circuit of the sweep generator 76 which causes the electronic beam of the oscilloscope 44 to expand linearly with time in the form of a spiral following transmission of the pulse.

Thus as the echo pulse signal is fed on to the brightening grid 44b of the oscilloscope 44, it will cause the spirally sweeping beam to brighten over a relative narrow arc y—y on the oscilloscope screen as shown in Fig. 1.

Since the spiral sweep is synchronized with rotation of the sensitivity lobe of the transducer, this being so because of the fact that the generators 58 and 76 are rotated at the same speed by motor 75, the bearing of the center point of the arc over which the beam spot brightens on the oscilloscope screen relative to the screen center, or Ox will be the bearing at which the pulse echo struck transducer 37.

The range will of course be proportional to the length of vector Ox and the face of the oscilloscope screen may be calibrated to read directly in terms of yards if so desired.

If there is more than one target from which a pulse echo returns to transducer 37, each of them will appear on the oscilloscope screen and so the operator will be continuously supplied with a complete picture of the target situation throughout the entire underwater field.

*Switching modifications*

Figure 8:
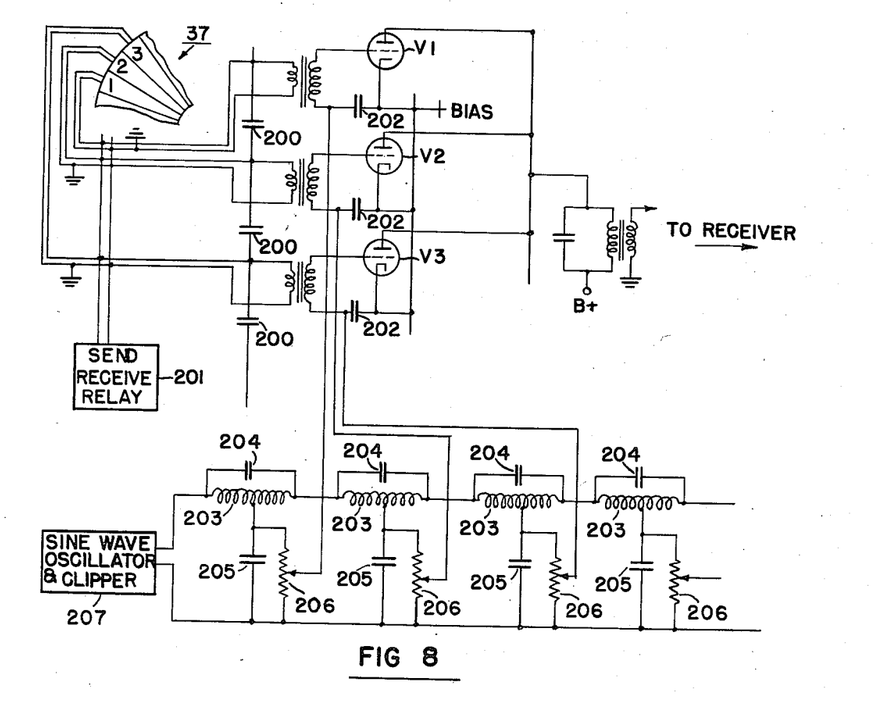
Fig. 8 is a schematic diagram of a repeated portion of a modified form of the invention.

It has been found practicable to replace the three phase generator and its associated phase splitting network by a pulse generator and transmission line for the purpose of switching the tubes on and off thus accomplishing pattern rotation. In this form of the invention leads from the transducer 37 are brought out in the usual manner to the low impedance side of the rotor input transformers as indicated in Fig. 8. Lead line condensers 200 are connected across adjacent transformer primaries as is the transmitting and receiving relay 201. The transformer secondaries representing the high impedance side of the transformer are connected at one end directly to the grids of the switching tubes and the other ends are connected through signal by-pass capacitances 202 to the cathodes of the switching tubes which are held at a positive potential relative to ground so that the grids are effectively negative with respect to the cathodes by an amount sufficient to bias the tubes beyond cut-off in the absence of a switching pulse.

The transmission line may consist of any combination of elements which will furnish a uniform, constant phase shift in each section but in the present instance each section comprises center tapped toroidal coils 203 bridged by a capacitor 204 and by parallel capacitances 205.

In the parallel leg of each section a voltage divider 206 is bridged to which connections are made to the several grid leads of the tubes to be switched. The purpose of the voltage divider 206 is to compensate for the attenuations of the switching pulse as it runs down the line. The components of the transmission line are so chosen as to give accurately a 10° phase shift per section in the switching frequency so that the line is 360° long in the case of a 36-element system.

While the switching frequency can be varied over relatively wide limits the present system has been designed in connection with a switching frequency of 200 cycles, the pulse being supplied by a conventional sine wave oscillator 207 which puts out a 200-cycle sine wave which is later clipped in a conventional manner so that only the tip of the sine wave goes down the line. The width of the switching pulse and its magnitude determine the number of tubes which conduct at any given moment and the state of their conductivity. For example, the peak of the switching pulse is always sufficient to overcome the grid bias of the tubes and may so far exceed this value that a voltage represented by half of the peak value may permit the tubes to conduct in a relatively feeble manner. Thus the tube which is at any instant receiving the center of the switching pulse conducts to the greatest extent while those of each side of it conduct to a lesser extent and so on in the same manner as has been explained in connection with the previously described form of the invention.

A still further simplification of the invention can be made by utilizing varistors in place of switching tubes. In this form, shown in Fig. 9, the transducer sections are connected directly to one side of a varistor 210 while the other side is connected through a bias maintaining capacitance 211 to the transmission line and, in turn, to the primary of a single, common input transformer 209. The grounded side of each transducer section is connected to a center tap of the input transformer, while the other, free end of the input transformer is connected, through a potentiometer 212 to a neutralizing capacitor 213 which opposes the varistor.

Figure 10:
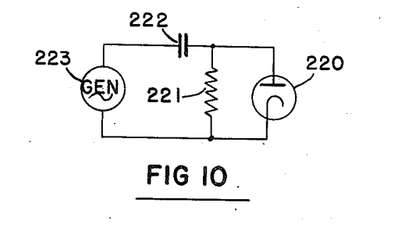
Fig. 10 is an equivalent circuit of a varistor.

The transmission line utilized is identical in form with that previously described but in the varistor rotor the clipping and pulse formation is accomplished automatically by the very characteristics of the varistor. If we consider the varistor as the equivalent of a diode 220 shunted by a resistor 221, as indicated in Fig. 10, with this combination connected in series with a capacitor 222 and a generator 223, it will be seen that the diode 220 will conduct on the positive half cycle only but that after a few cycles the capacitor 222 will become sufficiently charged that only enough flow will pass the diode to maintain the capacitor in its charged condition. This effectively clips all but the positive peaks of the generated wave.

If we now replace the generator in the simple circuit by the transmission line and the diode and resistor by a varistor it is apparent that the same action will be accomplished in the circuit.

Figure 9:
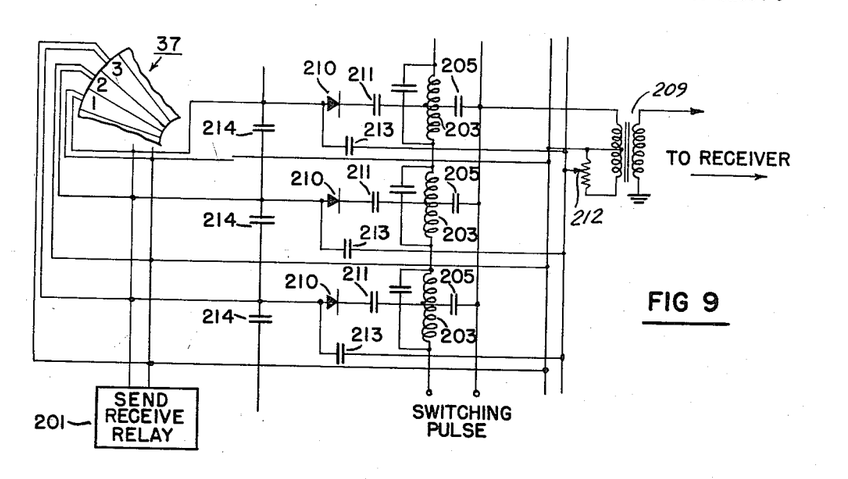
Fig. 9 is a schematic diagram of a portion of an additional modification in which the rotor employs varistor switching elements.

The varistors offer a resistance of something in the order of 200,000 ohms to current flow in one direction and a resistance of something in the order of 50 ohms to current flow in the other direction, the curve being of essentially even slope between $-1.5$ volts and $+1$ volt. While this is true in the case of direct currents it is not true for relatively high frequency alternating currents since the varistor is not a true resistance and has a fairly high capacitance between sections. Thus for frequencies in the order of 20 kc. the varistor, instead of presenting a resistance of some 200,000 ohms, has an impedance of only about 16,000 ohms in view of the path offered by it as a capacitor. This effect, can, however, be neutralized by opposing the varistor with a neutralizing capacitor the voltage across which is in phase with the voltage across the varistor. It is for this reason that the grounded side of the transducer is connected to the center tap of the primary while the neutralizing condenser 213 is connected, in effect, to the unused side of the primary winding of the input transformer.

Lead line condensers 214 are connected directly across the transducer sections in this form.

The pulse generator is connected to the transmission line in the same manner as has been described in connection with the vacuum tube rotor and the line is of the same length so that a switching pulse, as it runs down the line, makes successive varistors conductive thus accomplishing the pattern rotation. In this (varistor) case an additional advantage obtains in that the self-regulating feature of the varistor switch as herein designed obviates the necessity for amplitude equalizing voltage dividers at each junction of the switching line. That is, because of the automatic charging of the bias-maintaining capacitance 211 in each individual varistor circuit, switching pulse amplitude variations of $+2$ db do not change the operation of the circuit to any measurable extent. Another advantage of the varistor rotor is the elimination of 36 input transformers as compared with the vacuum tube rotor, as well as the elimination of all of the electrical supplies associated with the vacuum tubes which the varistors replace.

Figure 11:
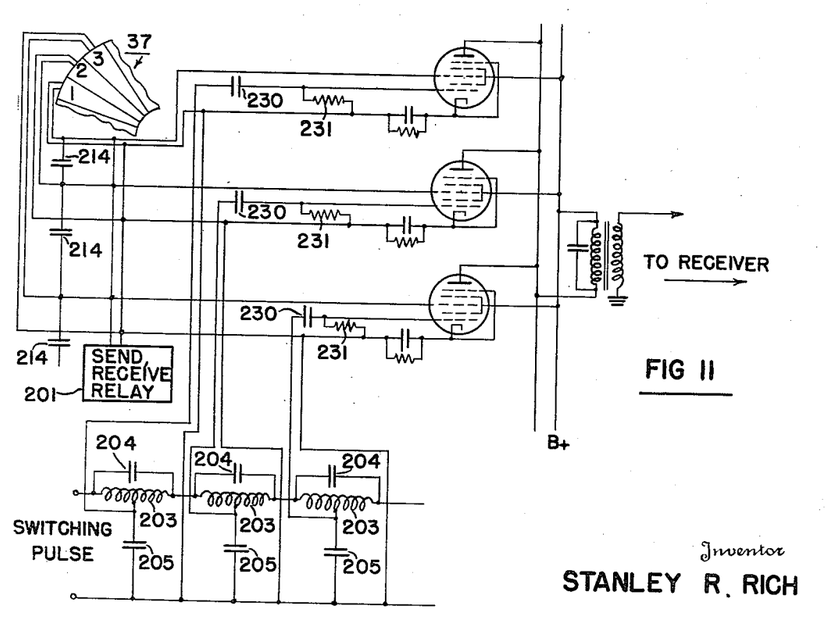
Fig. 11 is a schematic diagram of another modification of the invention.

The self regulating advantage of the varistor with the ensuing freedom from closely regulated switching voltages can be combined with the advantageous amplification of the triode switching form previously described, by the circuit shown in Fig. 11. As there shown a penta-grid tube is used with the first grid acting as the control grid and therefore connected to the transmission line through bias maintaining capacitance 230 a leakage path for which is established through resistance 231. The first grid and cathode of the tube thus acts as the diode to which reference has been made in the explanation of the varistor rotor. Signal from a transducer section is injected between the third grid and the cathode and appears at the anode only during the conducting interval of the tube as established by the first grid. It has been found that the shape and magnitude of the signal appearing at the anode is not affected at all by a change in magnitude of the sine wave input to the transmission line between the limits of 75–125 volts so that potentiometers 206 can be eliminated from the circuit shown in Fig. 8. The disposition of the 36 potentiometer controls makes this modification of the invention attractive. It should be appreciated that in some types of tubes, other grids than the third can be used for signal injection and other grids than the first can be used for control. Such changes are readily within the expected skill of one working in this art.

While the foregoing description has been predicated on the application of the invention to echo ranging, it will be apparent that it is equally applicable to listening for underwater noises originating from ships, submarines and the like. In this application, the underwater horizon is scanned continuously, each point being "looked at" sixty times per second (or 200 times per second in case switching is done by the transmission line) so that a persistent noise source will appear on the screen of the oscilloscope 44 as a radial sector of varying width depending upon the character of the noise, the excellence of noise transmission conditions and other factors. The beam is of such character that in practice it is possible for the operator to determine by the relative intensity the center of gravity of the beam and thus estimate with a good degree of accuracy the bearing of the noise source.

In conclusion it is to be understood that various changes in the preferred embodiment of my invention may be made by those skilled in the art without departing from the spirit and scope of the invention as defined in the appended claims.

What is claimed is:

1. In an apparatus for determining the bearing of a source of wave energy in a field, said apparatus being of the type utilizing a plurality of transducer segments differently oriented to cover a predetermined part of said field, scanning means for said transducer segments comprising, a conductive electric valve for each transducer segment, connections between an input side of each electric valve and the transducer segment associated therewith, a common connection between the output side of all of said valves, sequence control means comprising a phase shifting circuit connecting all of said electric valves for rendering groups of said valves conductive in sequence and in the same order as said transducer segments whereby a signal appearing in the common circuit of said valves is comprised of the output of the group of transducer segments associated with the then conductive valves.

2. The combination in claim 1 wherein the valves comprise triode vacuum tubes and the grid bias on each said tube comprises both direct and alternating current components, and grid bias altering means connected to said phase shifting line for controlling the alternating current component of each tube in accordance with predetermined shifts in phase of an alternating current source.

3. The combination in claim 1 wherein the valves comprise varistor elements.

4. The combination in claim 1 wherein the valves comprise penta-grid vacuum tubes with the first grid connected to the phase shifting line and with the transducer connection being made to the third grid.

5. In an apparatus for determining the bearing of a source of compressional wave energy in a field, said apparatus being of the type utilizing a plurality of transducer segments differently oriented to cover a predetermined part of said field, scanning means for said transducer segments comprising, an electronic valve for each transducer segment, connections between a first side of each valve and the transducer segment associated therewith, a common circuit between the other side of all of said valves, means for altering the bias on each said valves in succession and in the same order as said transducer segments to render a group of said valves conductive at any one instant, and a lead line connecting all of the valves with a similar lead section for each valve whereby a signal appearing in the common circuit is comprised of the output of a group of transducer segments, the phase shift and attenuation constants of said lead line being instantaneously changed by the input capacitance of a conductive valve whereby the phase shift of the associated lead line section is instantaneously reduced to a degree dependent upon the altered potential of said conductive valve.

6. Apparatus for determining the bearing of a source of compressional wave energy in a field comprising a circular array of transducer segments, an electronic valve for each segment, connections between a first side of each valve and the transducer segment associated therewith, connections between the other side of all of said valves, means for altering the conductive condition of each said valves in succession and in the same order as said transducer segments to render a group of said valves conductive at any one instant whereby a signal appearing in the output circuit of said valves is comprised of the output of the group of transducer segments associated with the then conductive valves, phase shifting means to combine the outputs of several of said transducer segments into a single signal, a field representation means, indicator means associated with the output of said valves for producing an indication on said field representation means when a signal is received and means for sweeping said indicator means around said field representation means, synchronously with operation of said means for altering the conductive condition of the valves.

7. Apparatus for determining the bearing of a source of compressional wave energy in a field comprising a circular array of transducer segments, an electronic valve for each transducer segment consisting of a triode, connections between the grid of each valve and the transducer segment associated therewith, connections between the anodes of all of said valves, means for altering the grid bias on each valve in succession and in the same order as said transducer segments to render a group of said valves conductive at any one instant whereby the signal appearing in the anode circuit of said valves is comprised of the output of the group of transducer segments associated with the then conductive valves, phase shifting means to combine the outputs of several of said transducer segments into a single signal, a field representation means, indicator means associated with said anode circuit for producing an indication on said field representation means when a signal is received, and means for sweeping said indicator means around said field representation means synchronously with operation of said grid bias altering means.

8. Apparatus for determining the bearing and range of a target in a given field, said apparatus comprising, transducer means including a circular array of transducer segments, an oscillator, means connecting all of said transducer segments simultaneously to said oscillator for a predetermined period to emit a pulse of compressional wave energy into said field, means for receiving an echo of said energy pulse, comprising an electronic valve consisting of a vacuum tube for each transducer segment, connections between a grid of each tube and the transducer segment associated therewith, connections between the anodes of all of said tubes, a phase shifting line connecting all of said first grids, means for altering the bias on each tube in succession and in the same order as said transducer segments to render a group of said tubes conductive at any one instant whereby a signal appearing in the anode circuit of said tube is comprised of the pulse echo output of the transducer segments associated with the then conductive tubes, a field representation means, indicator means associated with said anode circuit for producing an indication on said field representation means when a pulse echo is received, and means for spirally sweeping said indicator means around said field representation means, repetition of said sweep being synchronized with transmission of said energy pulse and the turns thereof being synchronized with operation of said grid bias altering means.

9. In an apparatus for determining the bearing of a source of wave energy in a field, said apparatus being of the type utilizing a plurality of transducer segments differently oriented to cover a predetermined part of said field, scanning means for said transducer segments comprising, varistor elements connected to each transducer segment, means normally biasing said varistor elements in one direction, means to overcome said normal bias whereby said varistors are rendered more conductive in succession and in the same order as said transducer segments, a common output circuit for said varistors, a phase shifting network connecting one side of all of said varistors, and neutralizing capacitors associated with said varistors to oppose the effect of the inherent capacity thereof.

10. The combination in claim 9 wherein the means to overcome the normal bias on the varistor elements includes a transmission line and means to generate an activating pulse into said line.

11. In an apparatus for determining the bearing of a source of wave energy in a field, said apparatus being of the type utilizing a plurality of transducer segments differently oriented to cover a predetermined part of said field, scanning means for said transducer segments comprising, an output circuit, an individual transmission switching signal path for each segment providing when transmissive a signal path from a transducer segment to the output circuit, commutator means for said signal paths for periodically rendering transmissive a group of said signal paths for adjacent transducer segments in sequence wherein one signal path is heavily transmissive and adjacent signal paths of the group are less transmissive.

12. In an apparatus for determining the bearing of a source of wave energy in a field, said apparatus being of the type utilizing a plurality of stationary transducer segments differently oriented to cover a predetermined part of said field, scanning means for said transducer segments comprising, an electric valve for each transducer segment, connections between the electric valve and its respective transducer segment, switching means including a phase-shifting network in the circuit with said electric valves for successively rendering small groups of said electric valves conductive, and circuit means connecting the outputs of all the electric valves with a common output circuit, whereby a signal appearing in the common output circuit comprises the output of a small group of said transducer elements and is dependent upon the conduction of said small group of electric valves.

References Cited in the file of this patent

UNITED STATES PATENTS

| | | |
|---|---|---|
| 1,995,708 | Fischer | Mar. 26, 1935 |
| 2,407,242 | Batchelder | Sept. 10, 1946 |
| 2,407,661 | Harrison | Sept. 17, 1946 |